(12) United States Patent
Beisele et al.

(10) Patent No.: US 11,926,727 B2
(45) Date of Patent: Mar. 12, 2024

(54) EPOXY RESIN COMPOSITION

(71) Applicant: Huntsman International LLC, The Woodlands, TX (US)

(72) Inventors: Christian Beisele, Muellheim (DE); Werner Hollstein, Freiburb (DE); Andreas Riegger, Binzen (DE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 17/557,103

(22) Filed: Dec. 21, 2021

(65) Prior Publication Data

US 2022/0135766 A1   May 5, 2022

Related U.S. Application Data

(62) Division of application No. 15/737,176, filed as application No. PCT/EP2016/062596 on Jun. 3, 2016, now abandoned.

(30) Foreign Application Priority Data

Jun. 16, 2015 (EP) .................................... 15172296

(51) Int. Cl.
| | |
|---|---|
| *C08K 3/36* | (2006.01) |
| *C08G 59/68* | (2006.01) |
| *C08K 3/01* | (2018.01) |
| *C08K 3/22* | (2006.01) |
| *C08K 9/06* | (2006.01) |
| *C08L 63/00* | (2006.01) |
| *H01B 3/40* | (2006.01) |

(52) U.S. Cl.
CPC ............... *C08K 3/36* (2013.01); *C08G 59/68* (2013.01); *C08G 59/686* (2013.01); *C08K 3/01* (2018.01); *C08K 3/22* (2013.01); *C08K 9/06* (2013.01); *H01B 3/40* (2013.01); *C08K 2003/2265* (2013.01); *C08K 2201/005* (2013.01); *C08K 2201/011* (2013.01); *C08K 2201/014* (2013.01)

(58) Field of Classification Search
CPC ... C08K 3/36; C08K 3/01; C08K 3/22; C08K 9/06; C08K 2003/2265; C08K 2201/005; C08K 2201/011; C08K 2201/014; C08G 59/68; C08G 59/686; H01B 3/40; C08L 63/00
USPC ......................................................... 523/400
See application file for complete search history.

(56) References Cited

U.S. PATENT DOCUMENTS

| | | | | |
|---|---|---|---|---|
| 4,025,485 A | * | 5/1977 | Kodama | H01B 7/295 528/31 |
| 6,225,701 B1 | * | 5/2001 | Hori | H01L 23/49568 257/E23.092 |
| 6,764,616 B1 | * | 7/2004 | Beisele | C08L 63/00 252/500 |
| 2009/0023843 A1 | * | 1/2009 | Beisele | C08K 5/3435 524/99 |
| 2009/0098384 A1 | * | 4/2009 | Hata | C09D 183/04 524/588 |

FOREIGN PATENT DOCUMENTS

| | | | | |
|---|---|---|---|---|
| DE | 102010015398 A1 | * | 10/2011 | ............... H01B 3/40 |
| JP | 06025512 A | * | 2/1994 | ............... C08L 63/00 |
| JP | 2007180044 A | * | 7/2007 | ............. H01B 17/00 |

OTHER PUBLICATIONS

Imai et al., JP 06-025512 A machine translation in English, Feb. 1, 1994 (Year: 1994).*
Albert et al., DE 102010015398 A1 machine translation in English, Oct. 20, 2011 (Year: 2011).*
Azechi et al., JP 2007180044 A machine translation in English used for citation, Jul. 12, 2007. (Year: 2007).*

* cited by examiner

*Primary Examiner* — David T Karst
(74) *Attorney, Agent, or Firm* — HUNTSMAN INTERNATIONAL LLC; David K. Wooten

(57) ABSTRACT

A composition comprising
(a) a cationically polymerisable epoxy resin,
(b) an initiator for the cationic polymerisation,
(c) a microparticle filler, and
(d) a nanoparticle filler
can be used for the production of thermally stable insulating material for electrical and electronic components.

8 Claims, No Drawings

EPOXY RESIN COMPOSITION

CROSS-REFERENCE TO RELATED APPLICATIONS

This application is a divisional application of U.S. patent application Ser. No. 15/737,176 filed Dec. 15, 2017, which is the National Stage application filed under 35 U.S.C. § 371 of International Application No. PCT/EP2016/062596 filed Jun. 3, 2016 which designated the United States of America and which claims priority to European App. Serial No. 15172296.4 filed Jun. 16, 2015. The noted applications are incorporated herein by reference in their entirety.

FIELD OF INVENTION

The present invention relates to a curable composition comprising an epoxy resin and a filler composition, a cured product obtained by curing said curable composition as well as the use of the curable composition as insulating material for electrical and electronic components, in particular as encapsulation system for printed circuit boards.

So far, the application temperature of encapsulated printed circuit boards used for power electronic applications has been moderate, because the control unit (based on a PCB encapsulated in an organic resin) and the power unit (insulated by ceramic) usually are separated. Thus, a strong heating of the control unit (that needs encapsulation) is avoided and lower grade materials can be used. However, due to the development of new high temperature stable boards based on new thermal stable materials, it will be possible in future to combine both units on a high temperature stable board. Accordingly, in certain applications the encapsulation material needs to withstand high temperatures.

Customary encapsulating materials are often based on epoxy resins in combination with anhydride hardeners. Some anhydrides, however, have been classified as "respiratory sensitizers" (hazard label: R42) according to REACH legislation.

BACKGROUND OF THE INVENTION

Accordingly, there is a need for a single-component encapsulation system free from respiratory sensitizer components with high storage stability at ambient temperature, good flow ability at application temperature and which after curing provides a material having high glass transition temperature ($T_g$>180° C.) in combination with good long-term thermal aging stability (grade H according to IEC 60216), low coefficient of linear thermal expansion (CTE<24 ppm/K) and a very good thermal cycle crack resistance (SCT<−200° C.).

It has now been found that a composition containing a cationically polymerisable epoxy resin in combination with a specific filler mixture fulfils the above-mentioned requirements to a great extent.

DETAILED DESCRIPTION

Accordingly, the invention relates to a composition comprising
(a) a cationically polymerisable epoxy resin,
(b) an initiator for the cationic polymerisation,
(c) a microparticle filler, and
(d) a nanoparticle filler.

For the preparation of the compositions according to the invention, epoxy resins suitable as component (a) are those customary in epoxy resin technology. Examples of epoxy resins are:

I) Polyglycidyl and poly(3-methylglycidyl) esters, obtainable by reaction of a compound having at least two carboxyl groups in the molecule with epichlorohydrin and p-methylepichlorohydrin, respectively. The reaction is advantageously performed in the presence of bases.

Aliphatic polycarboxylic acids may be used as the compound having at least two carboxyl groups in the molecule. Examples of such polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, for example hexahydrophthalic acid or 4-methylhexahydrophthalic acid.

Aromatic polycarboxylic acids, for example phthalic acid, isophthalic acid or terephthalic acid, may also be used as well as partly hydrogenated aromatic polycarboxylic acids such as tetrahydrophthalic acid or 4-methyltetrahydrophthalic acid.

II) Polyglycidyl or poly(β-methylglycidyl) ethers, obtainable by reaction of a compound having at least two free alcoholic hydroxy groups and/or phenolic hydroxy groups with epichlorohydrin or β-methylepichlorohydrin under alkaline conditions or in the presence of an acid catalyst with subsequent alkali treatment.

The glycidyl ethers of this kind are derived, for example, from acyclic alcohols, e.g. from ethylene glycol, diethylene glycol or higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylol-propane, pentaerythritol, sorbitol, and also from polyepichlorohydrins.

Further glycidyl ethers of this kind are derived from cycloaliphatic alcohols, such as 1,4-cyclohexanedimethanol, bis(4-hydroxycyclohexyl) methane or 2,2-bis(4-hydroxycyclo-hexyl)propane, or from alcohols that contain aromatic groups and/or further functional groups, such as N,N-bis(2-hydroxyethyl)aniline or p,p'-bis(2-hydroxyethylamino)diphenyl-methane. The glycidyl ethers can also be based on mononuclear phenols, for example resorcinol or hydroquinone, or on polynuclear phenols, for example bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane or 2,2-bis(3,5-dibromo-4-hydroxyphenyl) propane.

Further hydroxy compounds that are suitable for the preparation of glycidyl ethers are novolaks, obtainable by condensation of aldehydes, such as formaldehyde, acetaldehyde, chloral or furfuraldehyde, with phenols or bisphenols that are unsubstituted or substituted by chlorine atoms or by $C_1$-$C_9$alkyl groups, e.g. phenol, 4-chlorophenol, 2-methylphenol or 4-tert-butylphenol.

III) Poly(N-glycidyl) compounds, obtainable by dehydrochlorination of the reaction products of epichlorohydrin with amines containing at least two amine hydrogen atoms. Such amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as of 5,5-dimethylhydantoin.

IV) Poly(S-glycidyl) compounds, for example di-S-glycidyl derivatives, derived from dithiols, e.g. ethane-1,2-dithiol or bis(4-mercaptomethylphenyl)ether.

V) Cycloaliphatic epoxy resins, e.g. bis(2,3-epoxycyclopentyl)ether, 2,3-epoxycyclopentylglycidyl ether, 1,2-bis(2,3-epoxycyclopentyloxy) ethane or 3,4-epoxycyclohexylmethyl-3',4'-epoxycyclohexanecarboxylate.

It is also possible, however, to use epoxy resins wherein the 1,2-epoxy groups are bonded to different hetero atoms or functional groups; such compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin and 2-glycidyloxy-1,3-bis(5,5-dimethyl-1-glycidylhydantoin-3-yl) propane.

Preferably component (a) is a cycloaliphatic epoxy resin.

The term "cycloaliphatic epoxy resin" in the context of this invention denotes any epoxy resin having cycloaliphatic structural units, that is to say it includes both cycloaliphatic glycidyl compounds and p-methylglycidyl compounds as well as epoxy resins based on cycloalkylene oxides.

Suitable cycloaliphatic glycidyl compounds and p-methylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl) cyclohex-3-ene, bis(4-hydroxycyclohexyl)methane, 2,2-bis(4-hydroxycyclohexyl)propane and bis(4-hydroxycyclohexyl) sulfone.

Examples of epoxy resins having cycloalkylene oxide structures are bis(2,3-epoxycyclopentyl)ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy-6-methylcyclohexylmethyl-3',4'-epoxy-6'-methylcyclohexanecarboxylate, bis(3,4-epoxycyclohexylmethyl)adipate and bis(3,4-epoxy-6-methylcyclohexylmethyl)adipate.

In a further preferred embodiment the composition according to the invention contains as component (a) a cycloaliphatic epoxy resin selected from bis(4-hydroxycyclohexyl)methane-diglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester and, in particular, 3,4-epoxycyclohexylmethyl3',4'-epoxycyclohexanecarboxylate.

As initiator system for the cationic polymerisation of the epoxy resin there are used, for example, thermally activatable onium salts, oxonium salts, iodonium salts, sulfonium salts, phosphonium salts or quaternary ammonium salts that do not contain nucleophilic anions. Such initiators and their use are known. For example, U.S. Pat. No. 4,336,363, EP-A 379 464 and EP-A 552 disclose specific sulfonium salts as curing agents for epoxy resins. U.S. Pat. No. 4,058,401, in addition to describing specific sulfonium salts, also describes the corresponding salts of selenium and tellurium.

Quaternary ammonium salts as thermally activatable initiators are disclosed, for example, in EP-A 66 543 and EP-A 673 104. They are salts of aromatic-heterocyclic nitrogen bases with non-nucleophilic anions, for example complex halideanions such as $BF_4^-$, $PF_6^-$, $SbF_6^-$, $SbF_5OH^-$ and $AsF_6^-$.

When quaternary ammonium salts are used, it is advantageous to use in addition a thermal free-radical former, for example pinacols and their ethers, esters or silyl derivatives. Such compounds are known and can be prepared in accordance with known procedures.

Such initiator systems are described, for example, in WO 00/04075.

Accordingly, the invention further relates to a composition as defined above containing as component (b) a mixture comprising (b1) a quaternary ammonium salt with an aromatic heterocyclic cation having one or two nitrogen atoms and a non-nucleophilic anion selected from $BF_4^-$, $PF_6^-$, $SbF_6^-$, $SbF_5OH^-$, $BX_pY_q^-$ or $CF_3(CF_2)_mSO_3^-$, wherein p and q are 0, 1, 2, 3 or 4, provided that p+q=4, X denotes halogen or hydroxyl, Y represents phenyl or naphthyl which are unsubstituted or substituted by fluoro, trifluoromethyl, trifluoromethoxy, nitro or cyano, m is 0 or an integer from 1 to 17, and (b2) a 1,2-ethanediol substituted by four aromatic radicals Preferably the compositions according to the invention contain as component (b1) a quaternary ammonium salt with an aromatic heterocyclic cation of formula (1), (2) or (3)

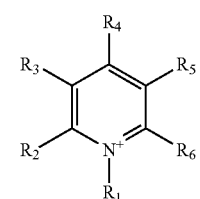

(1)

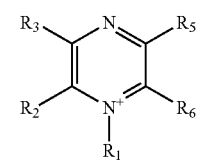

(2)

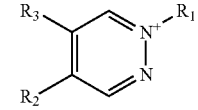

(3)

wherein $R_1$ is $C_1$-$C_{12}$alkyl, $C_7$-$C_{36}$aralkyl, $C_3$-$C_{15}$alkoxyalkyl or benzoylmethyl, $R_2$, $R_3$, $R_4$, $R_5$ and $R_6$ independently of the other are hydrogen, $C_1$-$C_4$alkyl or phenyl or $R_2$ and $R_3$ or $R_3$ and $R_4$ or $R_4$ and $R_5$ or $R_5$ and $R_6$ together with the carbon atoms to which they are attached form a benzene, naphthalene, pyridine or quinoline ring.

When any of the radicals $R_1$-$R_6$ is alkyl, that radical or those radicals may be straight-chain or branched. Examples of alkyl groups are methyl, ethyl, n-propyl, isopropyl, n-butyl, isobutyl, sec-butyl, tert-butyl, n-pentyl, neopentyl, n-hexyl, n-heptyl, n-octyl, isooctyl, n-decyl and n-dodecyl.

Aralkyl groups as $R_1$ have preferably from 7 to 30 carbon atoms, especially from 7 to 12 carbon atoms.

Examples of suitable aralkyl groups are benzyl, 2-phenylethyl, tolylmethyl, mesitylmethyl and 4-chlorophenylmethyl.

Examples of suitable alkoxyalkyl groups are 2-methoxyethyl, 3-methoxypropyl, 4-methoxybutyl, 6-methoxyhexyl, 2-ethoxyethyl, 3-ethoxypropyl, 4-ethoxybutyl and 6-methoxyhexyl.

More preferably, the compositions contain as component (b1) a quaternary ammonium salt of formula (4)

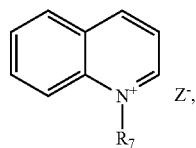

(4)

wherein R7 denotes methyl, ethyl, n-butyl, benzyl or benzoylmethyl, and $Z^-$ is hexafluorophosphate, hexafluoroarsenate, hexafluoroantimonate, pentafluorohydroxyantimonate, tetrafluoroborate, tetrakis[3,5-bis(trifluoromethyl)phenyl]borate and tetrakis(pentafluorophenyl)borate.

Individual examples of suitable compounds of the formula (4) are N-methylquinolinium hexafluorophosphate, N-methylquinolinium hexafluoroarsenate, N-methylquinolinium hexafluoroantimonate, N-methylquinolinium pentafluorohydroxyantimonate, N-methylquinolinium tetrafluoroborate, N-methylquinolinium tetrakis[3,5-bis(trifluoromethyl)phenyl]borate, N-methylquinolinium tetrakis(pentafluorophenyl)borate, N-ethylquinolinium hexafluorophosphate, N-ethylquinolinium hexafluoroarsenate, N-ethylquinolinium hexafluoroantimonate, N-ethylquinolinium pentafluorohydroxyantimonate, N-ethylquinolinium tetrafluoroborate, N-ethylquinolinium tetrakis[3,5-bis(trifluoromethyl)phenyl]borate, N-ethylquinolinium tetrakis(pentafluorophenyl)borate, N-butylquinolinium hexafluorophosphate, N-butylquinolinium hexafluoroarsenate, N-butylquinolinium hexafluoroantimonate, N-butylquinolinium pentafluorohydroxyantimonate, N-butylquinolinium tetrafluoroborate, N-butylquinolinium tetrakis[3,5-bis(trifluoromethyl)phenyl]borate, N-butylquinolinium tetrakis(pentafluorophenyl)borate, N-benzylquinolinium hexafluorophosphate, N-benzylquinolinium hexafluoroarsenate, N-benzylquinolinium hexafluoroantimonate, N-benzylquinolinium pentafluorohydroxyantimonate, N-benzylquinolinium tetrafluoroborate, N-benzylquinolinium tetrakis[3,5-bis(trifluoromethyl)phenyl]borate, N-benzylquinolinium tetrakis(pentafluorophenyl)borate, N-benzoylmethyquinolinium hexafluorophosphate, N-benzoylmethyquinolinium hexafluoroarsenate, N-benzoylmethyquinolinium hexafluoroantimonate, N-benzoylmethyquinolinium pentafluorohydroxyantimonate, N-benzoylmethyquinolinium tetrafluoroborate, N-benzoylmethyquinolinium tetrakis[3,5-bis(trifluoromethyl)phenyl]borate and N-benzoylmethyquinolinium tetrakis(pentafluorophenyl)borate.

The most preferred compound of the formula (4) is N-benzylquinolinium hexafluoroantimonate.

Preferably the compositions according to the invention contain as component (b2) a compound of formula (5)

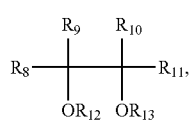

(5)

wherein $R_8$, $R_9$, $R_{10}$ and $R_{11}$ independently of the other are phenyl that is unsubstituted or substituted by $C_1$-$C_{12}$alkyl, $C_1$-$C_{12}$alkoxy, $C_7$-$C_{36}$aralkyl, $C_6$-$C_{36}$aryl, $C_3$-$C_{15}$alkoxyalkyl, $C_1$-$C_{12}$alkylthio, $C_1$-$C_{12}$alkylcarbonyl, halogen, nitro or cyano, and $R_{12}$ and $R_{13}$ independently of the other are hydrogen or $C_1$-$C_{12}$alkyl.

Examples for suitable compounds of formula (5) are 1,2-bis(2-methylphenyl)-1,2-diphenyl-1,2-ethanediol, 1,2-bis(2-ethylphenyl)-1,2-diphenyl-1,2-ethanediol, 1,2-bis(2-fluorophenyl)-1,2-diphenyl-1,2-ethanediol, 1,2-bis(2,6-difluorophenyl)-1,2-diphenyl-1,2-ethanediol and, in particular, 1,1,2,2-tetraphenyl-1,2-ethanediol.

The compositions according to the invention optionally comprise a curing accelerator as additional component. Suitable accelerators are known to the person skilled in the art. Examples that may be mentioned are:
- complexes of amines, especially tertiary amines, with boron trichloride or boron trifluoride; tertiary amines, such as benzyldimethylamine;
- urea derivatives, such as N-4-chlorophenyl-N,N'-dimethylurea (monuron);
- unsubstituted or substituted imidazoles, such as imidazole or 2-phenylimidazole.

Preferred accelerators are imidazoles, in particular N-methylimidazole.

An essential component of the curable composition according to the present invention is a filler composition comprising a microparticle filler and a nanoparticle filler.

The microparticle filler is preferably selected from globular or angular metal or semi-metal oxides, nitrides, carbides and hydroxides, especially from the group consisting of silica flour, amorphous silica (natural amorphous silica or fused silica), aluminium oxide, silicon carbide, boron nitride, aluminium nitride, aluminium hydroxide and magnesium hydroxide.

According to a preferred embodiment the microparticles have an average particle size ($d_{50}$) of 1 to 100 µm, more preferably from 2 to 50 µm and most preferably from 5 to 25 µm determined according to ISO 13320-1:1999.

Component (c) of the compositions according to the invention is preferably amorphous silica. Advantageously, the amorphous silica is natural amorphous silica or fused silica. Fused silica with an average particle size ($d_{50}$) of 10.5 µm is commercially available under the name TECOSIL® from CE Minerals, Greenville, TN, USA. Natural amorphous silica is available under the name AMOSIL® from Quarzwerke, Germany.

According to a preferred embodiment the amorphous silica has an average particle size $d_{50}$ of 1 to 100 µm, more preferably from 2 to 50 µm and most preferably from 5 to 25 µm determined according to ISO 13320-1:1999.

In a further preferred embodiment the amorphous silica is surface treated. Preferably, the amorphous silica is surface treated with a silane, more preferably selected from the group consisting of amino silane, epoxy silane, (meth)acrylic silane, methyl silane and vinyl silane.

Preferably the silane is a compound of the following formula:

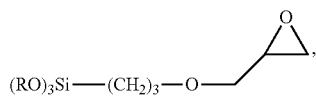

wherein R denotes methyl or ethyl.

The nanoparticle fillers are preferably selected from oxides, carbonates, nitrides and silicates of magnesium, calcium, boron, aluminium and silicon.

Especially preferred nanoparticle fillers essentially consist of calcium carbonate, boron nitride, montmorillonite or silicon dioxide.

Silica nanoparticles are particularly preferred.

The preparation of silicon dioxide nanoparticles is disclosed, for example, in WO 02/083776. The preferred silicon dixide nanoparticles are substantially spherical and have only slight, if any, agglomeration and/or aggregation. The nanoparticles are preferably surface-modified in order to prevent or reduce their agglomeration. In the case of silicon dioxide, a preferred surface modification is silanization with appropriate silanes, for examples the silanes mentioned above as surface modification agents for silica microparticles.

Such nanoparticle fillers are known and to some extent commercially available, for example under the designation NANOPOX® (supplied by Evonik). A preferred nanopartikel filler is NANOPOX® E 601, which is a dispersion of silica nanoparticles in a cycloaliphatic epoxy resin.

The average particle size of the silica nanoparticles $d_{50}$ is usually between 2 and 100 nm, preferably between 6 and 40 nm, more preferably between 8 and 80 nm and in particular between 10 and 25 nm.

$D_{50}$ is known as the medium value of particle diameter. This means that a powder comprises 50% of particles having a larger particle size and 50% of particles having a smaller particle size than the $d_{50}$ value.

The relative amounts of components (a), (b), (c) and (d) may vary within wide ranges. Preferably, the total amount of filler (c)+(d) is 60 to 90% by weight, preferably 65 to 85% by weight and in particular 70-80% by weight based on the total composition (a)+(b)+(c)+(d).

Preferably, the amount of microparticle filler (c) is 55 to 80% by weight, more preferably 60 to 75% by weight and in particular 65 to 70% by weight. based on the total composition (a)+(b)+(c)+(d).

Preferably, the amount of nanoparticle filler (d) is 2 to 20% by weight, more preferably 5 to 15% by weight and in particular 7 to 12% by weight. based on the total composition (a)+(b)+(c)+(d).

The amount of cationically polymerisable epoxy resin (a) is preferably 10 to 40% by weight, more preferably 15 to 30% by weight and in particular 20 to 25% by weight. based on the total composition (a)+(b)+(c)+(d).

The amount of initiator for the cationic polymerisation initiator (b) is preferably 0.05 to 1.0% by weight, more preferably 0.1 to 0.7% by weight and in particular 0.2 to 0.5% by weight. based on the total composition (a)+(b)+(c)+(d).

The curable composition according to the present invention can additionally comprise further additives, such as flexibilizers, thixotropic agents, wetting agents, antisettling agents, colour agents, defoamers, light stabilizers, mold release agents, toughening agents, adhesion promoters, flame retardants, curing accelerators, etc.

The compositions according to the present invention are heat-curable mixtures.

To carry out the curing reaction, the cationically polymerisable epoxy resin (a) is mixed with the required amount of the initiator for the cationic polymerisation (b). These mixtures are stable at room temperature and can be handled without hazard. In general, it is not necessary to add any additional activating component prior to initiation of polymerisation, so that the mixtures are one-component systems which can be cured at any time. The polymerisation is initiated by heating the mixture to temperatures of 60-220° C., preferably 80-200° C. and in particular 100.-190° C., depending on the material used and the desired polymerisation time.

The cured products demonstrate surprisingly excellent mechanical properties, in particular with respect to thermal stability and crack resistance.

Therefore, a further embodiment of the present invention is a cured product which is obtainable by curing a curable composition according to the present invention.

The cured products according to the present invention are preferably used as electrically insulating construction material for electrical or electronic components.

The curable compositions according to the invention can specifically be applied as casting system for medium to high voltage applications, e.g. for insulators, bushings, transformers, instrument transformers and switchgears, in all cases for indoor as well as outdoor applications, especially as encapsulation systems for printed circuit boards.

The curable compositions according to the invention may be used as encapsulation material for stators and rotors of electrical machines such as motors or generators. They may be used either as full encapsulation systems or only for impregnation of the end turns of the windings.

Accordingly, a further embodiment of the present invention is a method for the manufacturing of electrical insulation equipment comprising the steps:
  (i) applying a curable composition according to the present invention to the housing of electrical components; and
  (ii) curing the curable composition at a temperature >60° C.

The invention further relates to the use of the composition according to the invention as insulating material for electrical and electronic components.

Preferably, the composition according to the invention is used as encapsulation system for printed circuit boards.

A further embodiment of the present invention is the use of the curable compositions as adhesives.

The invention is illustrated by the following non-limiting examples.

EXAMPLES

Measurement of Properties:

Unless otherwise indicated, the viscosity is determined with a Rheomat equipment (type 115, MS DIN 125 D=10/s) at 60° C.

Tensile strength and elongation at break are determined at 23° C. according to ISO R527 $K_{JC}$ (critical stress intensity factor) in MPa·$\sqrt{m}$ and $G_{JC}$ (specific break energy) in J/m$^2$ are 390 determined at 23° C. by double torsion experiment (Huntsman-internal method).

CTE (coefficient of linear thermal expansion) is determined according to DIN 53752

$T_g$ (glass transition temperature) is determined according to ISO 6721/94

SCT: Crack index (simulated crack temperature) is calculated based on $T_g$, $G_{JC}$, CTE and elongation at break according to the description given in WO 00/55254.

List of Used Raw Materials

ARALDITE®CY 179-1: 3,4-epoxycyclohexyl)methyl 3,4-epoxycyclohexanecarboxylate (supplied by Huntsman Advanced Materials (Switzerland) GmbH)

400 ARALDITE®XB 5992 liquid, low viscous bisphenol A epoxy resin, epoxide number: 4.9-5.1 eq/kg (supplied by Huntsman)

ARALDITE®XB 5993 liquid, pre-accelerated anhydride curing agent. (supplied by Huntsman)

ARADUR® HY 906 anhydride curing agent, mixture of 1-methyl-5-norbornene-2,3-dicarboxylic anhydride and 5-norbornene-2,3-dicarboxylic anhydride (supplied by Huntsman)

ACCELERATOR 1: 1-methylimidazole

INITIATOR 1: N-benzylquinolinium hexafluoroantimonate (supplied by Huntsman)

CO-INITIATOR 1: 1,1,2,2-tetraphenyl-1,2-ethanediol (supplied by Natland Int. Corp.)

NANOPOX® E 601: 60% by weight of 3,4-epoxycyclohexyl)methyl-3,4-epoxycyclohexanecarboxylate and 40% by weight of surface-modified silica nanoparticles (supplied by Evonik)

AEROSIL® R 972: (supplied by Evonik) 415 fumed silica aftertreated with DDS (Dimethyldichlorosilane), AMOSIL® 510: (supplied by Quarzwerke) fused silica produced from natural amorphous silica by grinding with subsequent air separation; average particle size $d_{50}$: 11 µm (supplied by Quarzwerke)

AMOSIL® 520: fused silica produced from natural amorphous silica by grinding with subsequent air separation; average particle size $d_{50}$: 21 µm (supplied by Quarzwerke)

BYK W 940 anti-settling additive (supplied by: BYK-Chemie GmbH),

BYK W 995 wetting and dispersing agent, phosphate-containing polyester (supplied by: BYK-Chemie GmbH), BYK 070: defoaming agent based on silicones and polymers (supplied by: BYK-Chemie GmbH)

SILFOAM® SH: antifoam agent, (supplied by Wacker)

BAYFERROX® 225 iron oxide pigment (supplied by Lanxess)

TREMIN® 283-600 wollastonite, surface-treated with a epoxysilane, average particle size $d_{50}$: 21 µm (supplied by Quarzwerke)

SILAN A-187 γ-glycidyloxypropyltrimethoxysilane (supplied by Momentive)

Example A1

Initially, 2 master batches containing the ingredients of the initiator are prepared as follows:

Masterbatch A: 90 g of ARALDITE® CY 179-1 and 10 g of Co-initiator 1 are mixed at 90° C. for 30 min. The resulting clear solution is cooled to room temperature (RT).

Masterbatch B: 90 g of ARALDITE® CY 179-1 and 10 g of Initiator 1 are mixed at 60° C. for 30 min. The resulting clear solution is cooled to RT.

138 g of ARALDITE® CY 179-1, 450 g of NANOPOX® E 601, 34 g of Master batch A, 26 g of Master batch B, 4.2 g of SILFOAM® SH, 10 g BYK-W 940, 4.2 g BYK 070 and 4.0 g AEROSIL® R 972 are put into an Esco mixer of sufficient size. The content of the mixer is then stirred with a disperser stirrer with 100 rpm while heating up to 50° C.

Then 435 g of AMOSIL® 510 and 894.6 g of AMOSIL® 520 are added slowly in several portions while mixing at 100 rpm. After 5 min the mixer is stopped and the walls are scratched and the material is put into the mixture. Then the mixture is stirred for another 70 min. under vacuum at 50° C. After 30 min. of mixing the walls are scratched again and the material is put into the mixture.

To produce 4 mm thick test plates, metal molds were preheated to about 80° C. in an oven. Then the degassed resin is poured in the mold. The mold is then put to an oven at 120° C. for 1 hour. After that the oven temperature is raised to 180° C. for 90 min. Then the mold is taken out of the oven and opened after cooling down to room temperature. The obtained plate is used to cut out test specimens for the $K_{IC}/G_{IC}$ tests, for the tensile strength testing, the $T_g$ measurement via DSC and the determination of the CTE according to the standards mentioned above. The results are given in Table 1.

Comparative Example C1

As described in Example 2 of WO 2010/112272, 100 g of ARALDITE® XB 5992 are mixed with 90 g of ARALDITE XB 5993 and the mixture is heated while slightly stirring with a propeller stirrer to about 60° C. for about 5 minutes. Then the mixer is stopped and 2 g of BAYFERROX® 225 is added and the mixer is started again for about 1 min. Subsequently, while stirring, 51.3 g of TREMIN® 283-600 EST and 290.7 g of AMOSIL® 520 are added in portions and the mixture is heated up to 60° C. under stirring for about 10 minutes. Then the mixer is stopped and the vessel is degassed carefully by applying a vacuum for about 1 minute.

The mixture is poured into a 140° C. hot steel mold to prepare plates for the determination of the properties (4 mm thickness). The mold is then put to an oven for 30 minutes at 140° C. After thermally curing the mold, the mold is taken out of the oven and the plates are cooled down to ambient temperature (25° C.).

The results of the tests are summarised in Table 1.

Comparative Example C2

1. Epoxy Resin Formulation:

950 g NANOPOX® E 601, 3.75 g SILFOAM® SH, 5.0 g BYK W 955, 6.25 g BYK 070, 12.5 g SILAN A-187 and 22.5 g AEROSIL® R 972 are put to a Esco mixer of sufficient size. The content of the mixer is then heated up 60° C. and stirred with a dissolver stirrer with 300 rpm under vacuum at 60° C. for 3 min. Then the vacuum is broken and 500 g of AMOSIL® 510 and 1000 g of AMOSIL® 520 are added slowly in several portions while mixing at 300 rpm at 60-65° C. under vacuum. After 10 min the mixer is stopped, the vacuum is broken and the walls are scratched and the material is put to the mixture. Then the mixture is stirred another 5 min. under vacuum at 60-65° C. The vacuum is broken and the mixer walls are scratched again. Finally the mixture is stirred for 20 min. under vacuum at 300 rpm at 60-65° C.

2. Hardener Formulation:

879.8 g ARADUR®HY 906, 7.4 g ACCELERATOR 1, 10 g SLAN A-187 and 10 g of BYK-W 940 are put to an Esco mixer of sufficient size. The content of the mixer is then heated up 50° C. and stirred with a dissolver stirrer with 300 rpm under vacuum at 50° C. for 3 min. Then the vacuum is broken and 1092.8 g of AMOSIL® 510 are added slowly in several portions while mixing at 300 rpm at 50° C. under vacuum. After 10 min the mixer is stopped, the vacuum is broken and the walls are scratched and the material is put to the mixture. Then the mixture is stirred another 5 min. under vacuum at 50-55° C. The vacuum is broken and the mixer walls are scratched again. Finally the mixture was stirred for 20 min. under vacuum at 300 rpm at 55-60° C. 3. Preparation of Resin/Hardener-Mixture and Curing:

500 g of resin formulation and 325 g of hardener formulation are put together and heated to about 60° C. while stirring with 100 rpm under vacuum.

To produce 4 mm thick test plates, metal molds are preheated to about 80° C. in an oven. Then the degassed resin/hardener mixture is poured into the mold. The mold is then put to an oven at 100° C. for one hour, then for 1.5 hours at 140° C. and finally for 1.5 hours at 210° C. Then the mold is taken out of the oven and opened after cooling down to room temperature. The cured plate is subjected to various tests the results of which are given in Table 1.

TABLE 1

The amounts of the ingredients of Compositions A1, C1 and C2 are given in parts by weight

| | Composition | | |
|---|---|---|---|
| | A1 | C1 | C2 |
| ARALDITE ® CY 179-1 | 9.60 | | |
| ARALDITE ® XB 5992 | | 18.73 | |
| INITIATOR 1 | 0.13 | | |
| CO-INITIATOR 1 | 0.17 | | |
| ARALDITE ® XB 5993 | | 16.85 | |
| ARADUR ® HY 906 | | | 17.33 |
| ACCELERATOR 1 | | | 0.15 |
| NANOPOX ® E 601 | 22.50 | | 23.03 |
| AEROSIL ® R 972 | 0.20 | | 0.55 |
| AMOSIL ® 510 | 21.75 | | 33.65 |
| AMOSIL ® 520 | 44.73 | 54.44 | 24.24 |
| TREMIN ® 283-600 | | 9.61 | |
| BYK W 940 | 0.50 | | 0.20 |
| BYK W 995 | | | 0.12 |
| BYK 070 | 0.21 | | 0.15 |
| SILFOAM ® SH | 0.21 | | 0.09 |
| SILAN A-187 | | | 0.50 |
| BAYFERROX ® 225 | | 0.37 | |
| Viscosity at 60° C./Pa · s | 15 | 8.6 | 5 |
| Curing conditions | 1 h/120° C. 1.5 h/180° C. | 30 min/140° C. | 1 h/100° C. 1.5 h/140° C. 1.5 h/210° C. |
| Tensile strength/MPa | 75 | 86 | 62.3 |
| Elongation at break/% | 0.6 | 1.1 | 0.65 |
| $K_{1C}$/MPa · √m | 2.4 | 2.4 | 2.2 |
| $G_{1C}$/J/m$^2$ | 320 | 441 | 362 |
| R42 lable | no | yes | yes |
| CTE/ppm/K | 20 | 25.7 | 24 |
| $T_g$/° C. | 184 | 105 | 205 |
| SCT/° C. | −271 | −131 | −184 |

DISCUSSION OF TEST RESULTS

The inventive composition A1 provides a cured product that fulfills all the requirements of a single-component encapsulation system for high temperature stable insulations:

$T_g$>180° C., SCT<−200° C., CTE<20 ppm/K, free of R42 label.

Furthermore, the viscosity of the curable composition is sufficient low for applications as encapsulation system for printed circuit boards.

The product obtained from Comparative Example C1 has a quite low, but yet insufficient SCT of −131 at a $T_g$ of 105° C. (which is far too low) and a CTE of 25.7 (which is too high). The properties of the cured product according to Comparative Example C2 are satisfactory with respect to $T_g$ and CTE, but completely insufficient with respect to SCT. It is not a solution to the problem because it is R42-labelled, but mainly because the SCT is far too high (−84° C. vs. target of −200° C.). Furthermore, Composition C2 suffers from the classification as hazardous substance (label R42, "respiratory sensitizer")

What is claimed is:

1. A method for insulating electrical or electronic components comprising the steps
   (i) applying a heat curable composition that is stable at room temperature to one or more electrical or electronic components; and
   (ii) curing the curable composition at a temperature greater than 60° C., wherein the curable composition comprises:
   (a) 10-40% by weight, based on the total amount of components (a)+(b)+(c)+(d), of a cationically polymerisable cycloaliphatic epoxy resin,
   (b) an initiator for the cationic polymerisation,
   (c) a microparticle filler with an average particle size of 5-25 μm comprising at least one of an angular amorphous silica, an angular aluminium oxide or an angular semi-metal nitride, carbide or hydroxide, and
   (d) a silica nanoparticle,
   to provide a material having a glass transition temperature greater than 180° C., wherein component (b) is a mixture comprising:
   (b1) a quaternary ammonium salt with an aromatic heterocyclic cation having one or two nitrogen atoms and a non-nucleophilic anion selected from $BF_4^-$, $PF_6^-$, $SbF_6^-$, $SbF_5OH^-$, $BX_pY_q^-$ or $CF_3(CF_2)_mSO_3^-$, wherein p and q are 0, 1, 2, 3 or 4, provided that p+q=4,
   X denotes halogen or hydroxyl,
   Y represents phenyl or naphthyl which are unsubstituted or substituted by fluoro, trifluoromethyl, trifluoromethoxy, nitro or cyano, and
   m is 0 or an integer from 1 to 17; and
   (b2) a 1,2-ethanediol substituted by four aromatic radicals.

2. The method according to claim 1, wherein the component (b2) is a compound of formula (5)

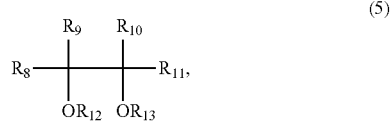

wherein $R_8$, $R_9$, $R_{10}$ and $R_{11}$ independently of the other are phenyl that is unsubstituted or substituted by $C_1$-$C_{12}$ alkyl, $C_1$-$C_{12}$ alkoxy, $C_7$-$C_{36}$ aralkyl, $C_6$-$C_{36}$ aryl, $C_3$-$C_{15}$ alkoxyalkyl, $C_1$-$C_{12}$ alkylthio, $C_1$-$C_{12}$ alkylcarbonyl, halogen, nitro or cyano, and $R_{12}$ and $R_{13}$ independently of the other are hydrogen or $C_1$-$C_{12}$ alkyl.

3. The method according to claim 1, wherein the total amount of microparticle filler (c) and nanoparticle filler (d) of the curable composition is 60 to 90% by weight, based on the total amount of components (a), (b), (c), and (d).

4. The method according to claim 1, wherein the amount of nanoparticle filler (d) in the curable composition is 2 to 20% by weight, based on the total amount of components (a), (b), (c), and (d).

5. The method according to claim 1, wherein the one or more electrical or electronic components are selected from printed circuit boards, stators, rotators, bushings, transformers, and/or switchgears.

6. An insulated electrical and electronic component obtained by the method according to claim 1.

7. A method for insulating electrical or electronic components comprising the steps
   (i) applying a heat curable composition that is stable at room temperature to one or more electrical or electronic components; and
   (ii) curing the curable composition at a temperature greater than 60° C. to provide a material having a glass transition temperature greater than 180° C., wherein the curable composition comprises:
      (a) 10-40% by weight, based on the total weight of components (a)+(b)+(c)+(d)+(e), of a cationically polymerisable cycloaliphatic epoxy resin,
      (b) a curing accelerator selected from tertiary amines, urea derivatives, unsubstituted or substituted imidazoles, and one or more complexes of amines with boron trichloride or boron trifluoride,
      (c) a microparticle filler with an average particle size of 5-25 μm comprising at least one of an angular amorphous silica, an angular aluminium oxide or an angular semi-metal nitride, carbide or hydroxide, and
      (d) a silica nanoparticle filler and
      (e) an initiator for the cationic polymerization comprising:
   (b1) a quaternary ammonium salt with an aromatic heterocyclic cation having one or two nitrogen atoms and a non-nucleophilic anion selected from $BF_4^-$, $PF_6^-$, $SbF_6^-$, $SbF_5OH^-$, $BX_pY_q^-$ or $CF_3(CF_2)_mSO_3^-$, wherein p and q are 0, 1, 2, 3 or 4, provided that p+q=4,
   X denotes halogen or hydroxyl,
   Y represents phenyl or naphthyl which are unsubstituted or substituted by fluoro, trifluoromethyl, trifluoromethoxy, nitro or cyano, and
   m is 0 or an integer from 1 to 17; and
   (b2) a 1,2-ethanediol substituted by four aromatic radicals.

8. An insulated electrical and electronic component obtained by the method according to claim 7.

* * * * *